United States Patent [19]
Park et al.

[11] Patent Number: 5,933,408
[45] Date of Patent: Aug. 3, 1999

[54] OPTICAL DISK DRIVE

[75] Inventors: Byung-yeob Park; Young-won Lee; Sang-tae Kim; Hyun-woo Lee, all of Suwon; Chul-ho Jeon, Kwacheon, all of Rep. of Korea

[73] Assignee: Samsung Electronics Co., Ltd., Kyungki-Do, Rep. of Korea

[21] Appl. No.: 09/012,562

[22] Filed: Jan. 23, 1998

Related U.S. Application Data

[62] Division of application No. 08/700,098, Aug. 20, 1996.

[30] Foreign Application Priority Data

Jul. 10, 1996 [KR] Rep. of Korea .................. 96-27834

[51] Int. Cl.$^6$ .................. G11B 23/00; G11B 33/02
[52] U.S. Cl. .................. 369/271; 369/77.1; 369/75.2; 369/75.1
[58] Field of Search .................. 369/219, 44.14, 369/244, 44.32, 215, 75.2, 77.2, 270, 271

[56] References Cited

U.S. PATENT DOCUMENTS

| | | |
|---|---|---|
| 5,434,839 | 7/1995 | Chjoi .................. 369/75.2 |
| 5,610,889 | 3/1997 | Ishii et al. .................. 369/75.2 |
| 5,610,900 | 3/1997 | Yamashita et al. .................. 369/271 |
| 5,737,304 | 4/1998 | Soga et al. .................. 369/247 |

*Primary Examiner*—Stuart S. Levy
*Assistant Examiner*—Tod Kupsta
*Attorney, Agent, or Firm*—Sughrue, Mion, Zinn, Macpeak & Seas, PLLC

[57] ABSTRACT

An optical disk drive adopting an optical disk as a recording medium is provided. The optical disk drive includes an adjusting mechanism on a deck to adjust phase and tilt. The adjusting mechanism includes a phase adjusting device which is installed on the deck, for supporting one end of at least one of first and second shafts to adjust the phase, and a complex adjusting device which is rotatably installed on the deck, for supporting the other end of the at least one shaft to adjust the tilt and phase. Therefore, the optical disk drive can store a large amount of information in a disk by a highly precise deck mechanism and be stably installed regardless of the installation direction and position thereof. Further, a tray can be ejected without electric power and simple and convenient assembling and maintenance thereof are guaranteed.

18 Claims, 15 Drawing Sheets

5,933,408

OPTICAL DISK DRIVE

This is a divisional of application Ser. No. 08/700,098 filed Aug. 20, 1996 pending.

BACKGROUND OF THE INVENTION

The present invention relates to an optical disk drive using an optical disk as a recording medium.

An optical disk drive adopts an optical disk such as a compact disk (CD), a VIDEO-CD, a laser disk (LD), a digital video disk (DVD), a CD-ROM or a DVD-ROM as a recording medium..

Generally, an optical disk drive should be capable of storing much information in a disk and be installed stably regardless of the installation direction and position. Also, assembling and maintenance thereof should be simple and convenient.

The above requirements of the optical disk drive will be described with reference to FIGS. 1, 2A and 2B.

First, in order to store a large amount of information in a disk 1, information should be recorded on the disk 1 with high density. That is, the width of the tracks on the disk 1 and the interval between the tracks should be narrow. As described above, in order to store information in the disk 1 with high density or reproduce the stored information with high density, a highly precise optical pickup 2 and a deck mechanism 3 are also required.

For realizing the highly precise deck mechanism 3, an optical axis of light beam radiated from the optical pickup 2 to the disk 1 should be precisely movable radially with respect to the disk. For the above, the phase and the tilt of the optical pickup 2 should be precisely adjusted.

A phase difference occurs when the beam radiated from the optical pickup 2 deviates from the radial optical path on the disk 1 seated on a turntable 4. Also, the tilt occurs when the optical axis of the beam is tilted with respect to the disk 1. The tilt is divided into two components, that is, a radial tilt in which the beam is tilted to the radius direction of the disk 1, and a tangential tilt in which the beam is tilted to the tangential direction of the disk 1. The tilt is caused by assembling errors of shafts 5 for guiding the optical pickup 2 in the radial direction of the turntable 4 or from an assembling error of a spindle motor 7 installed on a deck 6. That is, the tilt occurs when the shafts 5 are not installed horizontally with respect to the deck 6, or when the spindle motor 7 is not installed vertically with respect to the deck 6 so that a rotary shaft 8 of the spindle motor 7 is not vertical with respect to the deck 6.

Second, each constituent such as tray 9, deck 6, optical pickup 2 and ascending/descending means (not shown) should be designed and assembled stably regardless of the installation direction and location. For example, as shown in FIG. 2A, there is no problem when an optical disk drive 10 is installed in the horizontal direction. However, as shown in FIG. 2B, a problem may occur when the optical disk drive 10 is installed in the vertical direction.

Third, each constituent to be assembled on a base frame (not shown) such as tray 9, deck 6, optical pickup 2 and ascending/descending means (not shown) should be properly designed for easy and simple assembling of the optical disk drive 10.

Fourth, constituents which are malfunctioning should be easily replaceable for easy and convenient maintenance. For example, if the phase and the tilt of the optical axis of the beam radiated from the optical pickup 2 to the disk 1 are changed when replacing a malfunctioning optical pickup 2, the phase and the tilt normally must be readjusted.

SUMMARY OF THE INVENTION

It is an object of the present invention to provide an optical disk drive which can store a large amount of information in a disk, having no limitation with respect to the installation direction and position, and which can be easily and simply assembled and maintained.

To achieve the above object, there is provided an optical disk drive including a deck to which a spindle motor is fixed, first and second shafts installed on the deck, an adjusting mechanism for adjusting a phase and a tilt of the first and second shafts, and an optical pickup which is slidably mounted on the first and second shafts and moves along the first and second shafts by an optical pickup driving means, wherein the adjusting mechanism comprises: a phase adjusting device which is installed on the deck, for supporting one end of at least one of the first and second shafts to adjust the phase; and a complex adjusting device which is rotatably installed on the deck, for supporting the other end of the at least one of the first and second shafts to adjust the tilt and phase.

Also, preferably, the phase adjusting device comprises: a tension rib which is rotatably mounted to the deck, for elastically pushing the at least one of the first and second shafts in a first lateral direction; a stop portion which is formed on the tension rib to limit the axial movement of the at least one of the first and second shafts; a cam which is rotatably installed on the deck, for pushing the one end of the at least one of the first and second shafts in a second lateral direction opposite to the first lateral direction; and a support, which is fixed to the deck, for preventing the at least one of the first and second shafts from ascending/descending.

In addition, preferably, the phase adjusting device comprises: a phase adjusting body which is installed on the deck and has a shaft receiving hole formed therethrough to receive the one end of the at least one of the first and second shafts; a fixing screw which is screwed into the shaft receiving hole to restrict the axial movement of the at least one of the first and second shafts; a pair of rotary cams which are rotatably coupled on the deck with the at least one of the first and second shafts interposed therebetween, each of said rotary cams having long and short rotational radii to move the at least one of the first and second shafts in a lateral direction.

To achieve the above object, there is provided an optical disk drive comprising: a base frame; a deck base connected to the base frame by hinge means; a tray which is inserted into/ejected from the base frame to carry a disk; disk loading means which is installed in the base frame, for ascending/descending one end of the deck base and inserting/ejecting the tray into/from the base frame; a deck fixed to the deck base; a spindle motor installed in the deck and having a shaft; a turntable installed on the shaft of the spindle motor to receive the disk; buffering means installed between the deck base and the deck; and clamping means which is installed in the base frame to clamp the disk ascended by the turntable, wherein the clamping means comprises: a support which is fixed to the deck base and includes a clamp depression having a slant portion, a hole formed at the center of the clamp depression and a plurality of supporting ribs protruded from the slant portion of the clamp depression toward the center of the clamp depression; a clamp base which is received in the clamp depression and has a plurality of flexible clamp ribs at an edge thereof which correspond to the supporting ribs; and a clamp plate fixed to the clamp base, wherein the clamp ribs are bent by the supporting ribs when pushing the clamp base into the clamp depression.

Also, preferably, the clamp base has a plurality of locking pieces and the clamp plate has a plurality of wings corresponding to the locking pieces, wherein the wings are locked by the locking pieces.

In addition, preferably, a clamp shaft is connected to the center of the clamp base and a clamp shaft receiving groove is formed at the center of the turntable, wherein the clamp base and the turntable are coupled along a common axis as the clamp shaft is inserted into the clamp shaft receiving groove.

According to the optical disk drive of the present invention having the above features, a large amount of information can be stored in a disk by a highly precise deck mechanism. Also, there is no limitation on the installation direction and position thereof. Further, a tray can be ejected without electric power, and simple and convenient assembling and maintenance thereof are guaranteed.

BRIEF DESCRIPTION OF THE DRAWINGS

The above object and advantages of the present invention will become more apparent by describing in detail preferred embodiments thereof with reference to the accompanying drawings, in which.

DETAILED DESCRIPTION OF THE PREFERRED EMBODIMENTS

Figure 1:
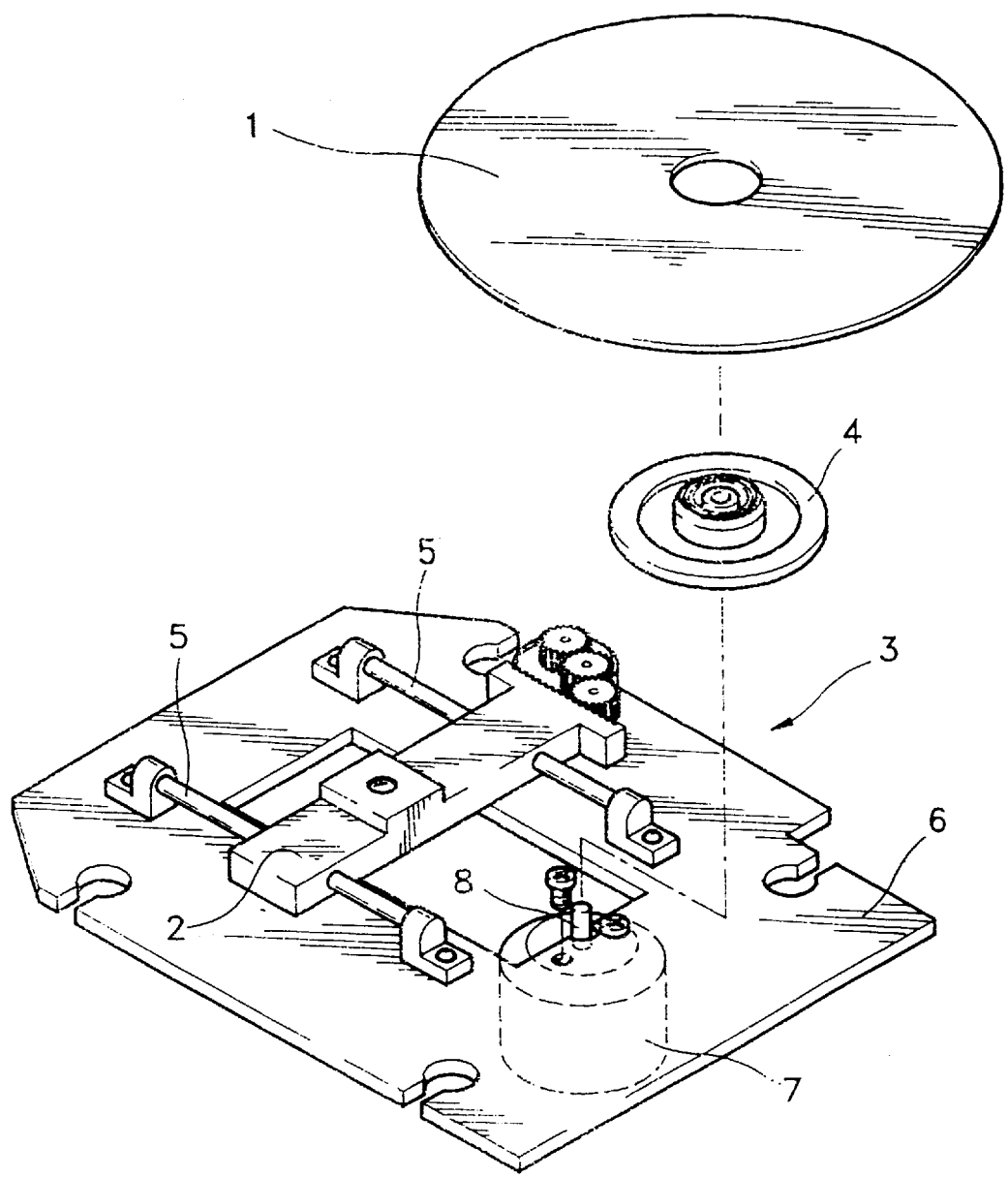
FIG. 1 is an exploded perspective view showing a deck of a conventional optical disk drive.
Figure 2A:
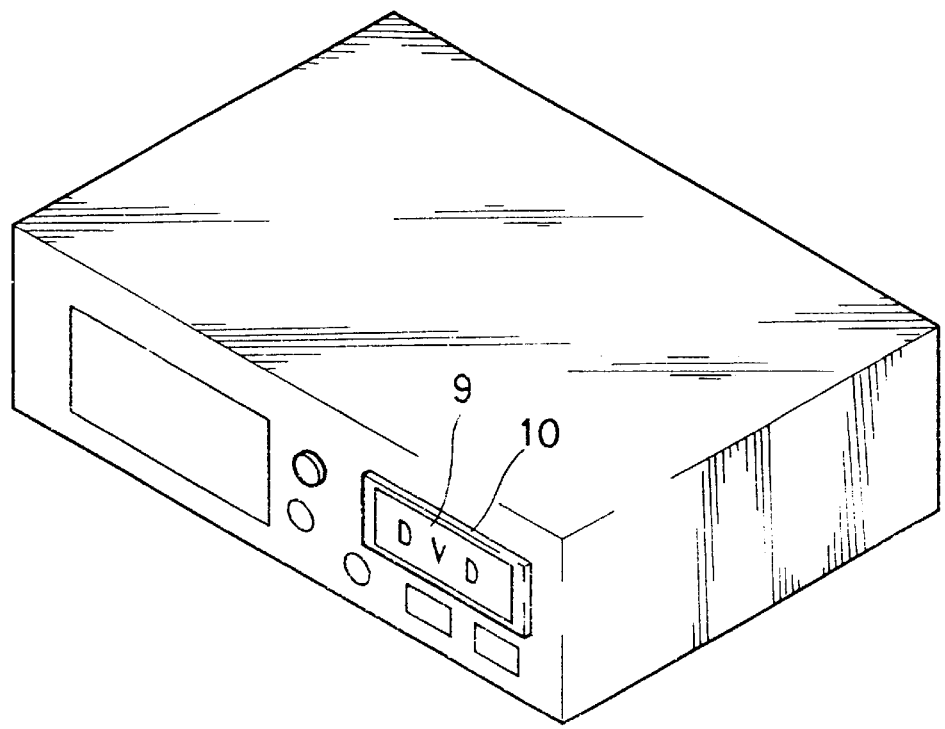
FIG. 2A is a perspective view of a general optical disk player when an optical disk drive is installed in the horizontal direction.
Figure 2B:
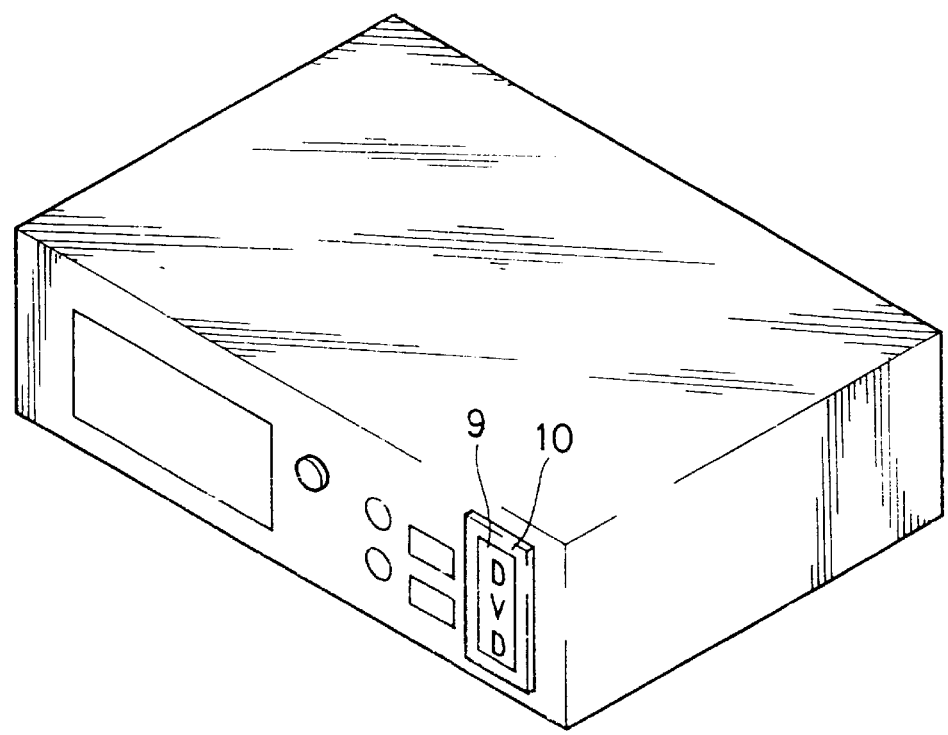
FIG. 2B is a perspective view of a general optical disk player when an optical disk drive is installed in the vertical direction.
Figure 3:
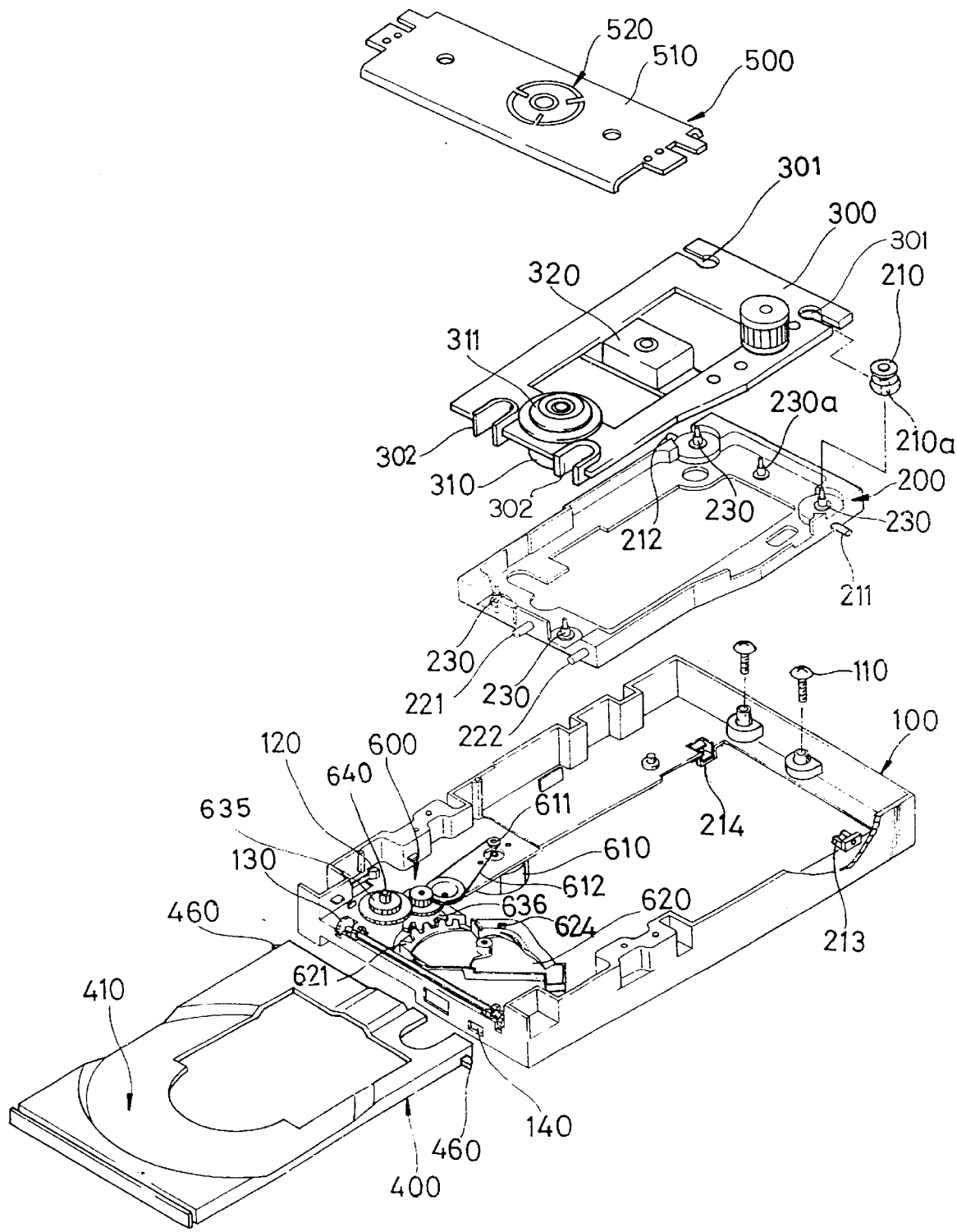
FIG. 3 is an exploded perspective view showing an optical disk drive according to the present invention.

Referring to FIG. 3, an optical disk drive according to the present invention is comprised of a base frame 100, a deck base 200, a deck 300, a tray 400, a clamping device 500 and a disk loading device 600.

<deck base>

Figure 4:
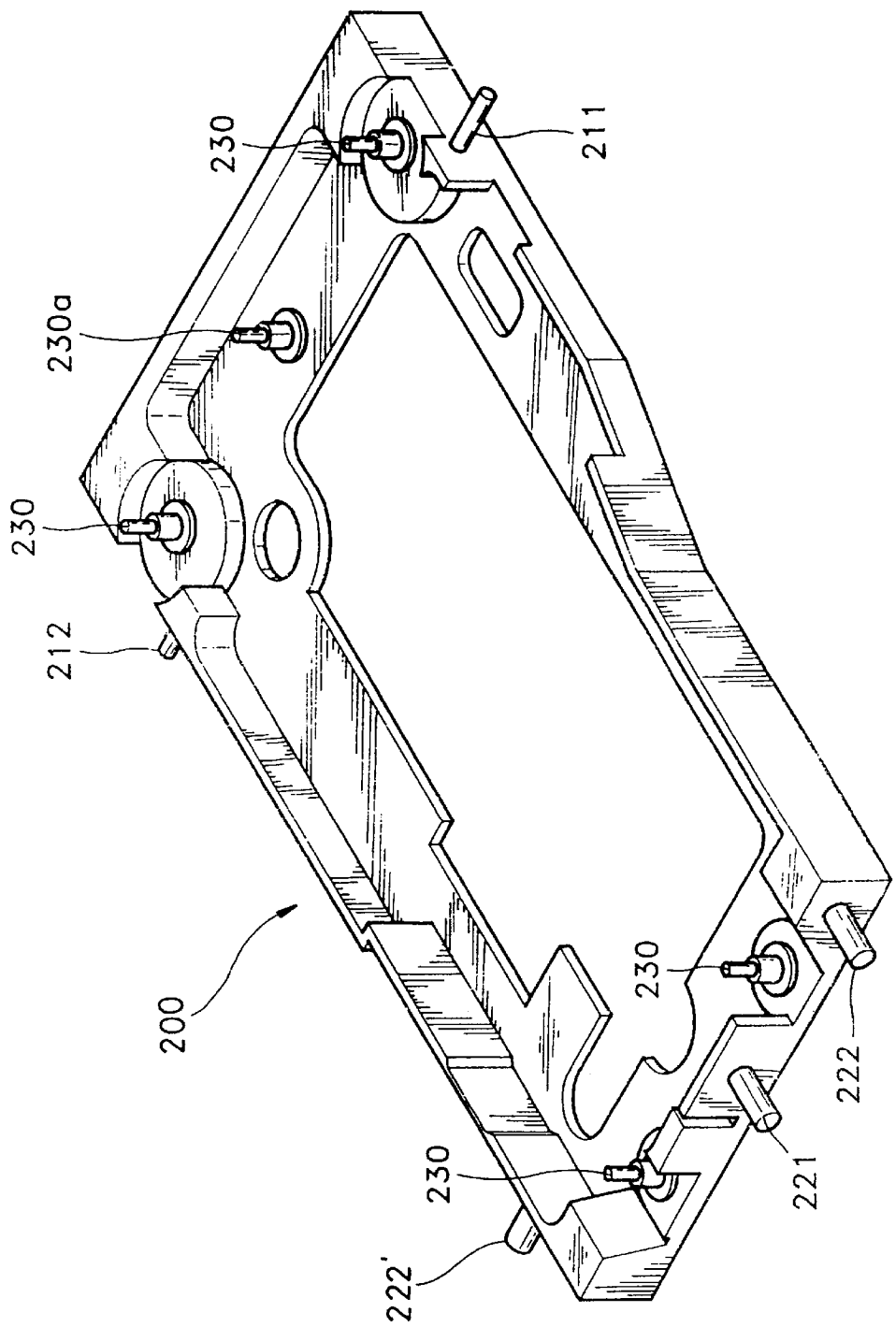
FIG. 4 is a perspective view of a deck base shown in FIG. 3.

Referring to FIGS. 3 and 4, first and second hinge shafts 211 and 212 formed at each sidewall of one end portion of the deck base 200 are connected to a hinge hole 213 and a hinge hook 214, respectively. Also, first and second ascending/descending protrusions 221 and 222 are formed at the other end of the deck base 200. The first ascending/descending protrusion 221 is ascended/descended by the disk loading device 600 and the second ascending/descending protrusion 222 is guided by an ascending/descending guide (not shown) provided in the base frame 100 in the up-and-down direction. Thus, the deck base 200 rotates through a predetermined angle by the disk loading device 600 according to the rotation of the first and second hinge shafts 211 and 212 within the hinge hole 213 and the hinge hook 214. Also, a third ascending/descending protrusion 222' (see FIG. 4) is installed at a sidewall of the other end portion of the deck base 200 to guide the ascending/descending of the deck base 200.

The deck 300 is installed on the deck base 200 and moves to perform a predetermined function while being integrated with the deck base 200 which moves upward and downward. The deck 300 is installed on the deck base 200 by buffering members 210. Also, five buffering protrusions 230 and 230a to be coupled with the buffering members 210 are formed on the deck base 200.

The above-described deck base 200 of the present invention has the following advantages.

First, when the deck base 200 is installed in the base frame 100, the first hinge shaft 211 is inserted into the hinge hole 213 and the second hinge shaft 212 is coupled with the hinge hook 214. As a result, the deck base 200 can be easily and simply assembled with and detached from the base frame 100.

Second, when the first ascending protrusion 221 of the deck base 200 is ascended/descended by the disk loading device 600, the second ascending/descending protrusion 222 is guided upward and downward by the ascending/descending guide (not shown). Accordingly, the deck base 200 does not deviate from a predetermined rotating path even if the optical disk drive is installed in the vertical direction.

<deck>

Figure 5:
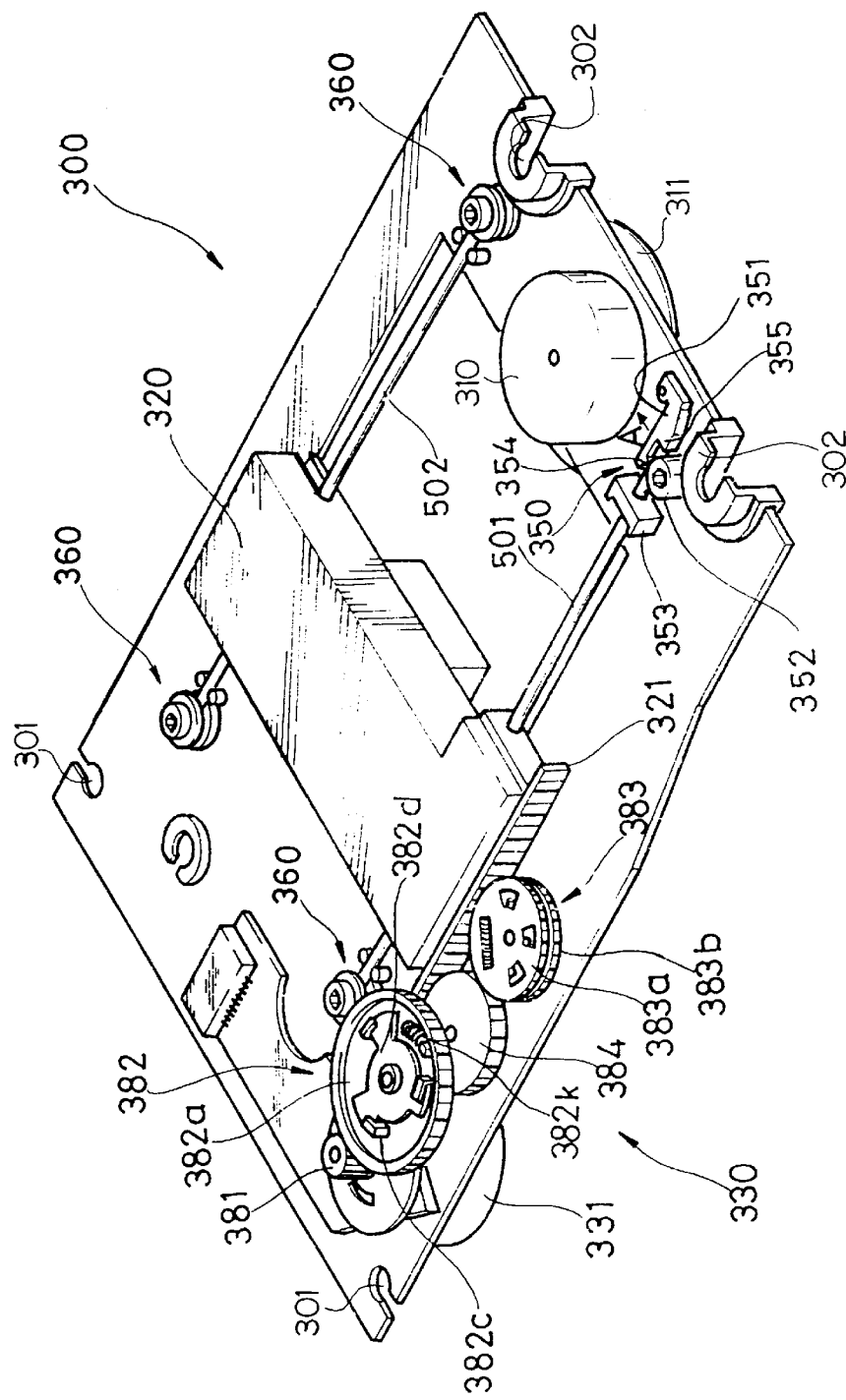
FIG. 5 is a perspective view of a deck shown in FIG. 3.

Referring to FIGS. 3 and 5, a spindle motor 310, first and second shafts 501 and 502, an optical pickup 320 and an optical pickup driving device 330 are mounted to the deck 300, and the deck 300 is installed on the deck base 200 by the buffering members 210.

A turntable 311 is fixed to the shaft of the spindle motor 310 installed below the deck 300 and a disk (not shown) is seated on the turntable 311. The turntable 311 is coupled with the clamping device 500 as the deck 300 is ascended/descended by the deck base 200, and the disk seated on the turntable 311 is closely pushed to the turntable 311 by the clamping device 500.

Each of the buffering members 210 has a slender neck, which is made of rubber, so as to minimize the impact and vibration that is transferred to the deck 300 from the outside. Particularly, one buffering member 210 coupled with the buffering protrusion 230a prevents the deck 300 from sagging down when the optical disk drive is installed in the vertical direction.

The necks of the buffering members 210 are caught in either a coupling hole 301 or a coupling member 302. The buffering protrusion 230 or 230a is inserted into a coupling hole 210a formed in each buffering member 210.

The first and second shafts 501 and 502 are installed on the deck 300 by an adjusting mechanism and the optical pickup 320 is slidably mounted on the first and second shafts 501 and 502. The optical pickup 320 is transferred in the radius direction of the turntable 311 along the first and second shafts 501 and 502 by an optical pickup driving device 330. The above adjusting mechanism includes a phase adjusting device 350 and a complex adjusting device 360.

Figure 15:
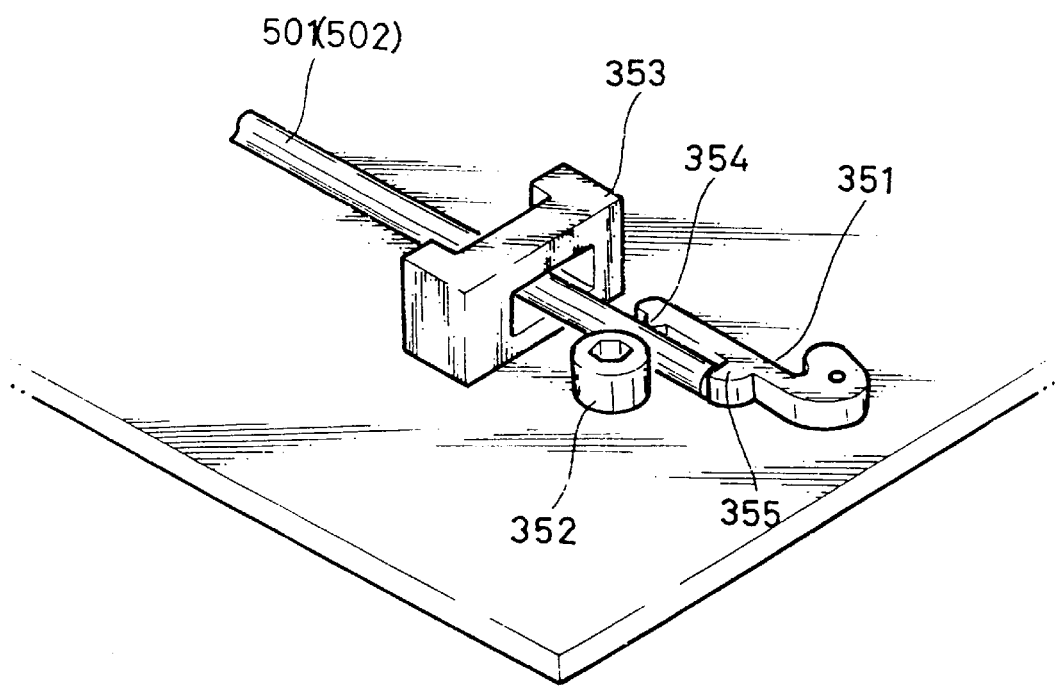
FIG. 15 is a perspective view of a phase adjusting device shown in FIG. 5.

Referring to FIGS. 5 and 15, the phase adjusting device 350 fixes one end of the first shaft 501 to the deck 300 and adjusts the phase of a laser beam radiated from the optical pickup 320. The phase adjusting device 350 is comprised of a tension rib 351, a phase adjusting cam 352 and a support 353.

A contact portion 354 and a stop portion 355 are formed in the tension rib 351 and the tension rib 351 is installed on the deck 300 to be elastically rotatable. The contact portion 354 contacts the one end of the first shaft 501, thereby elastically biasing the first shaft 501 toward the phase adjusting cam 352. The stop portion 355 prevents the one end of the first shaft 501 from shifting axially. Also, the phase adjusting cam 352 is rotatably installed with respect to the deck 300 to transfer the one end of the first shaft 501 laterally. The support 353 prevents the first shaft 501 from being ascended/descended.

If the above phase adjusting device 350 is used, the first shaft 501 can be easily detached by rotating the tension rib 351 to an A direction without change in the phase and tilt of the optical pickup when exchanging the optical pickup 320. Also, the phase of the first shaft 501 can be precisely adjusted.

Figure 11:
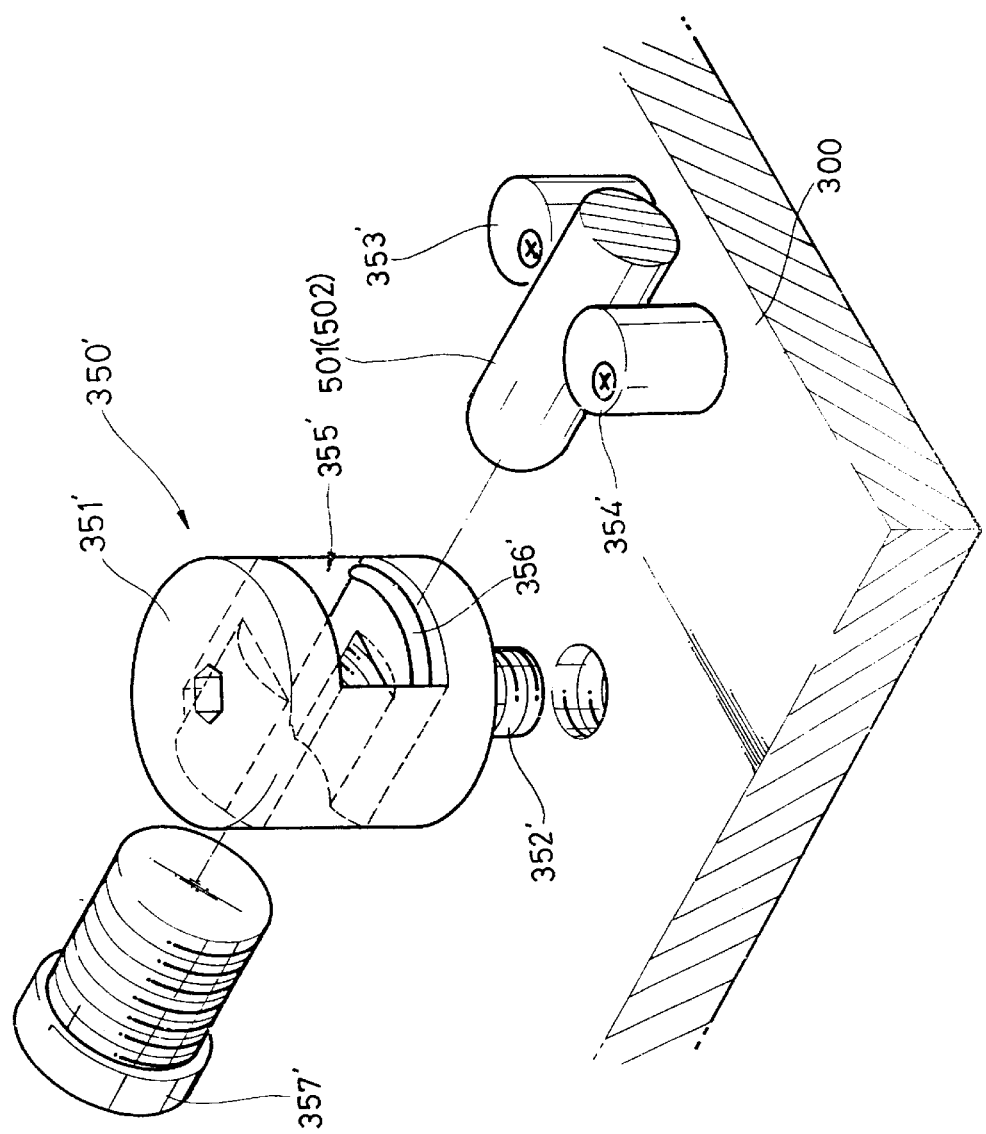
FIG. 11 is an exploded perspective view showing another example of a phase adjusting device shown in FIG. 5.
Figure 12:
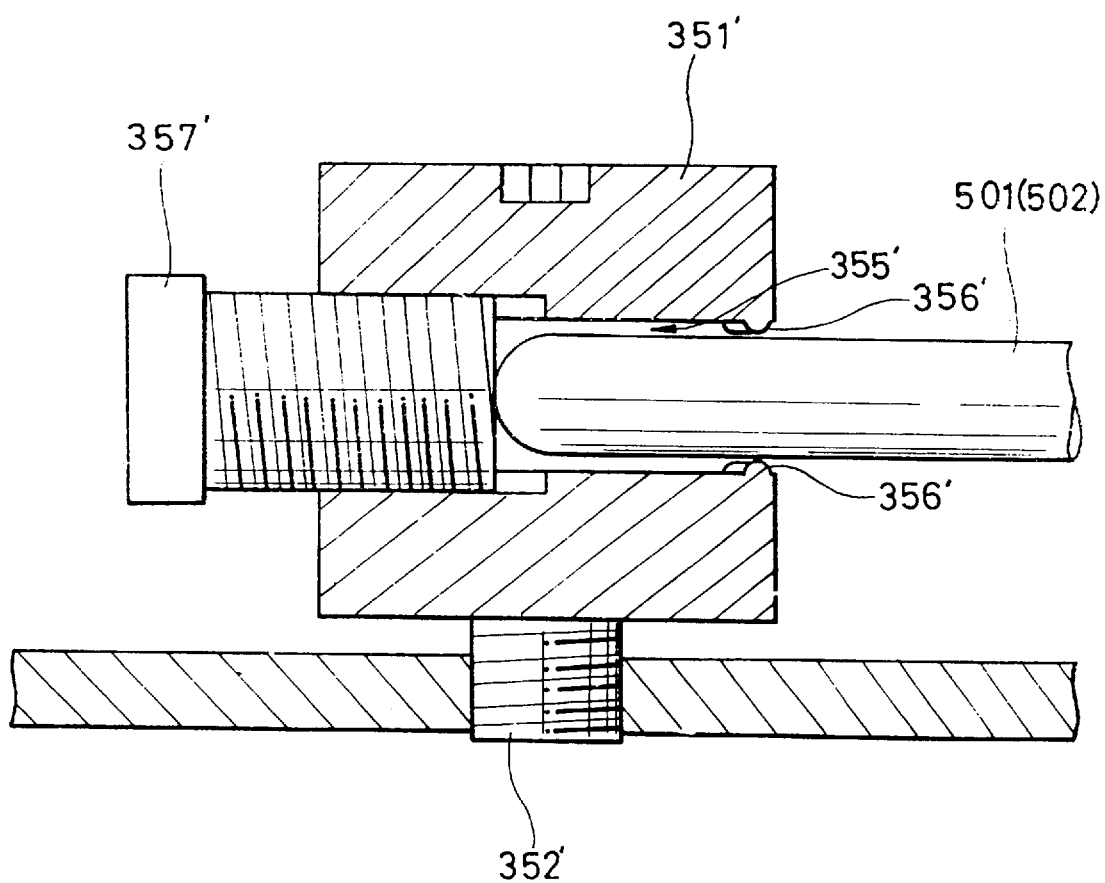
FIG. 12 is a cross-sectional view of the phase adjusting device shown in FIG. 11.

Referring to FIGS. 11 and 12, there is a phase adjusting device 350' modified from the phase adjusting device 350, which performs the same function as that of the phase adjusting device 350. The phase adjusting device 350' is comprised of a phase adjusting body 351' coupled to the deck 300, a fixing screw 352' fastening the phase adjusting body 350' to the deck 300, and first and second rotary cams 353' and 354' rotatably coupled to the deck 300.

The phase adjusting body 351' may be in a circular or polygonal cylinder, however, a circular one is illustrated as an example. A shaft receiving hole 355' is formed which passes through the circular phase adjusting body 351'. Also, protruded shoulders 356' (see FIG. 12) are, formed on the inside of each of an upper and lower portion of one side of the shaft receiving hole 355', respectively, and a fixing screw 357' is screwed into corresponding threads on the other side of the shaft receiving hole 355'.

The fixing screw 357' moves forward and backward in the shaft receiving hole 355' while being rotated by a screw driver (not shown). As shown in FIG. 12, the leading end of the fixing screw 357' which moves forward supports the first shaft 501 while contacting one end of the first shaft 501 inserted into the shaft receiving hole 355'.

The first and second rotary cams 353' and 354' are "outserted" on the deck 300 with the first or the second shaft 501 or 502 interposed therebetween, and each have long and short rotational radii. Also, a screw driver groove is formed on each upper portion of the first and second rotary cams 353' and 354'. When properly rotating the first and second rotary cams 353' and 354' using the screw driver, the first shaft 501 moves laterally according to the positions of the long and short rotational radii of the first or second rotary cam 353' or 354'. In this case, the first shaft 501 does not ascend/descend while being retained between the protruded shoulders 356' of the phase adjusting body 351'.

The term "outsert" is defined as the state where the first and second cams 353' and 354' are installed to be frictionally rotatable by a predetermined rotary force while being firmly coupled to the deck 300.

The above fixing screw 357' provides the following advantages. First, various shafts with different lengths can be properly positioned according to the moving distance of the fixing screw 357'. Second, when exchanging the optical pickup 320 (see FIG. 3), the first shaft 501 can be easily separated without a change in the phase and tilt of the optical pickup. That is, the first shaft 501 can be easily separated by screwing out the fixing screw 357'.

Figure 10:
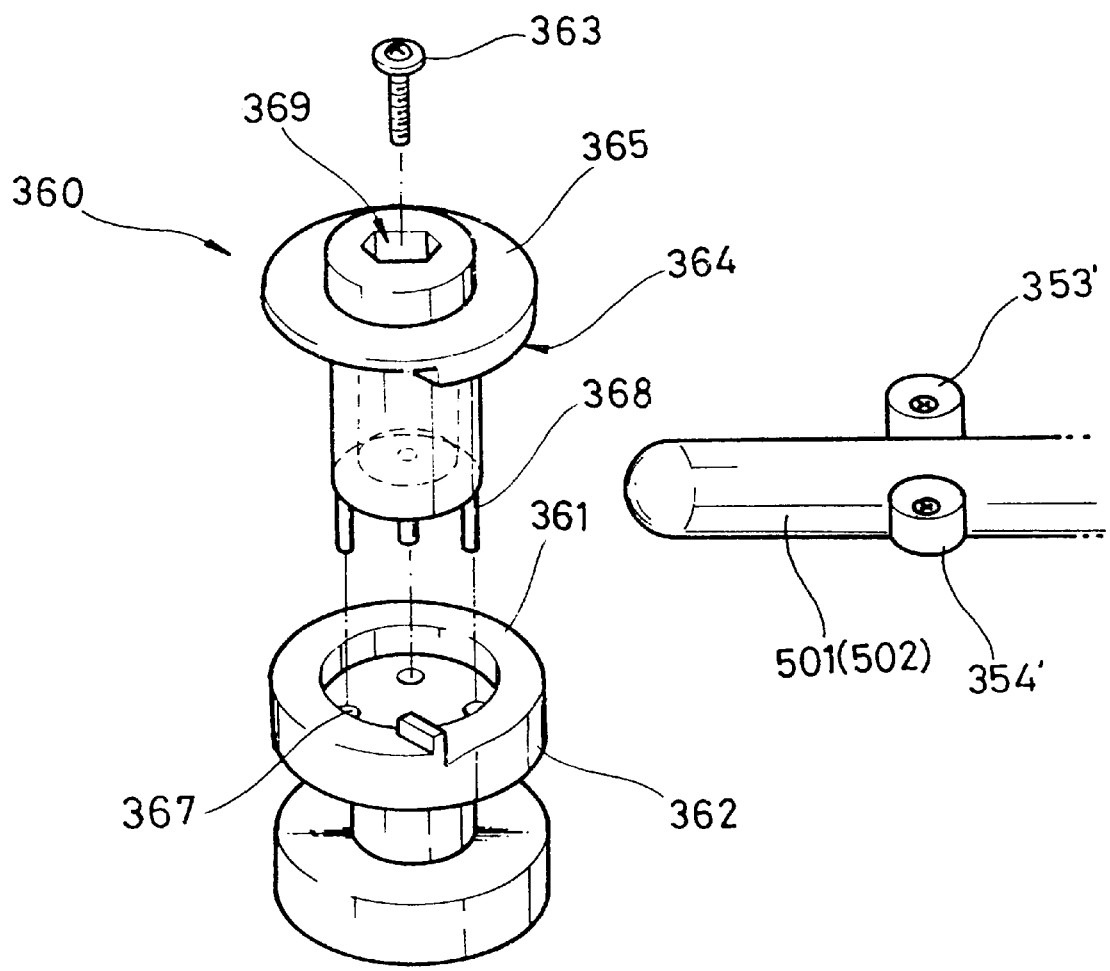
FIG. 10 is an exploded perspective view of a complex adjusting device shown in FIG. 5.

Referring to FIGS. 5 and 10, the complex adjusting device 360 includes a lower cam member 362, an upper cam member 365, the first and second rotary cams 353' and 354' (see FIG. 11) to move one end of the first or second shaft 501 or 502 vertically and laterally.

The lower cam member 362 is outserted on the deck 300 and has a first cam surface 361. The upper cam member 365 is coupled to the upper portion of the lower cam member 362 to rotate with the lower cam member 365 simultaneously, and has a second cam surface 364 being complementary to the first cam surface 361. In this case, one end of the first or second shaft 501 or 502 is inserted between the first and second cam surfaces 361 and 364.

In order to rotate the upper cam member 365 together with the lower cam member 362, a plurality of guide pins 368 are formed on the upper cam member 365 and a plurality of coupling holes 367 to which the guide pins are coupled are formed in the lower cam member 362. The guide pins 368 formed in the upper cam member 370 are coupled to the coupling holes 367 of the lower cam member 362 and further the upper cam member 365 and the lower cam member 362 are connected by using a screw 363. Thus, the upper cam member 365 and the lower cam-member 362 can rotate simultaneously.

Also, a groove 369 is formed on the surface of the upper cam member 365. This groove 369 is for rotating the first and second cam members 362 and 365 to ascend/descend the first or second shaft 501 or 502, thereby adjusting the tilt. That is, since the first and second cam surfaces 361 and 365 are tilted, the first or second shaft 501 or 502 inserted between the first and second cam surfaces 361 and 364 ascends/descends while the upper and lower cam members 362 and 365 rotate, so that the tilt is adjusted.

As described above, the complex adjusting device 360 provides the following advantages. First, a highly precise deck mechanism which can finely adjust the tilt and phase of the first or second shaft 501 or 502 is achieved. Second, when exchanging the optical pickup 320, the first shaft 501 can be easily separated while the phase is maintained without changes.

Referring to FIG. 5, the optical pickup driving device 330 includes an optical pickup driving motor 331 installed on the bottom surface of the deck 300, a rack 321 attached to the optical pickup 320, an optical pickup driving gear train installed between the rack 321 and the optical pickup driving motor 331 and which moves the optical pickup along the first and second shafts 501 and 502. The optical pickup driving gear train is comprised of a plurality of gears and transmits the driving force of the optical pickup driving motor 331 to the rack 321.

The optical pickup driving gear train is comprised of an optical pickup driving gear 381 fixed to the shaft of the optical pickup driving motor 331, a first backlash gear 382, a second backlash gear 383 and an idler gear 384. The first and second backlash gears 382 and 383 of the present invention are easily assembled, which will be described in detail.

Figure 14:
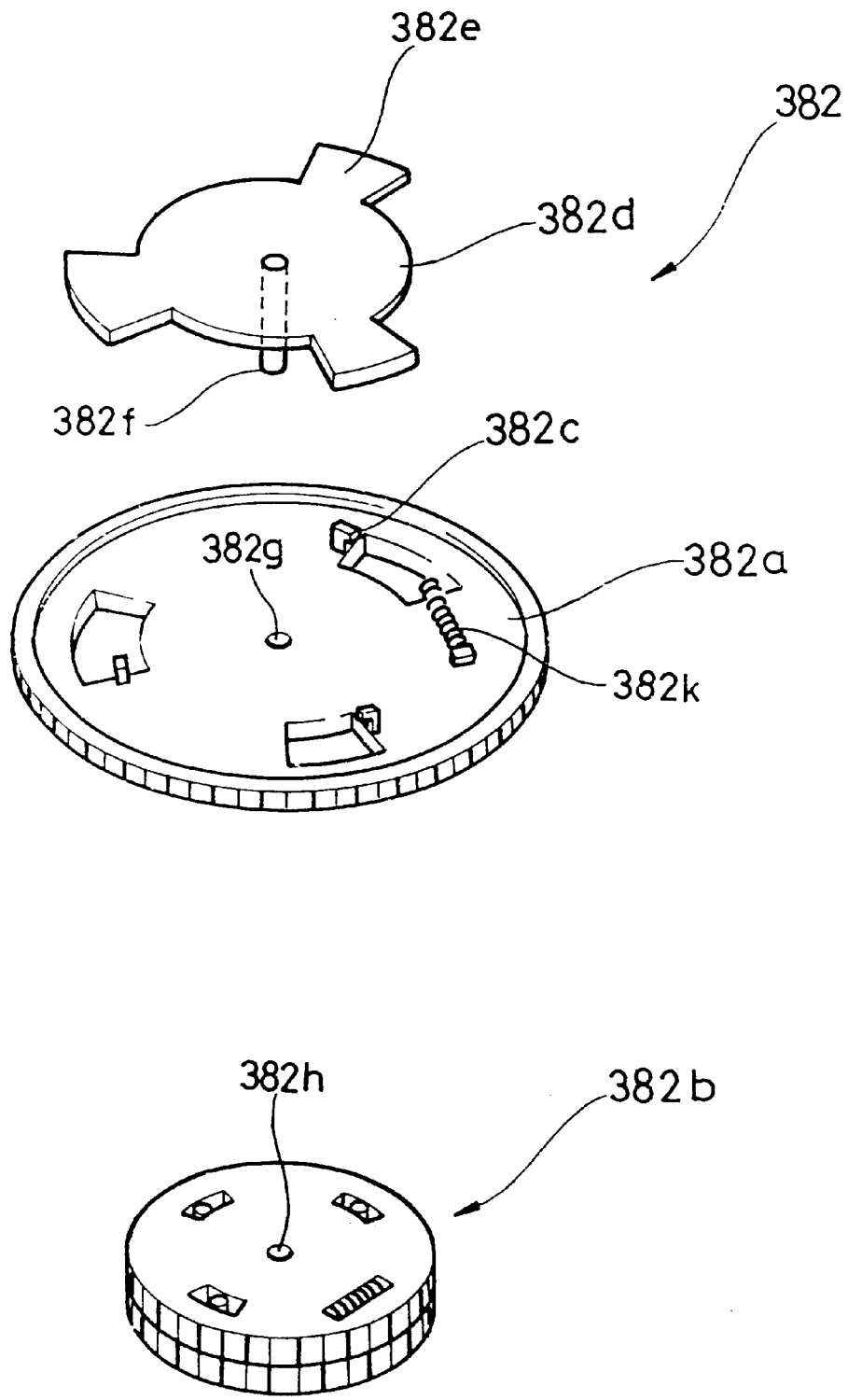
FIG. 14 is an exploded perspective view of a first backlash gear shown in FIG. 5.

Referring to FIGS. 5 and 14, the first backlash gear 382 includes a large backlash gear 382a and a small backlash gear 382b and prevents any backlash while connecting the optical pickup driving gear 381 and the idler gear 384. The large backlash gear 382a has three locking pieces 382c and a plate 382d having three wings 382e is attached on the large backlash gear 382a. The small backlash gear 382b is the same as the following second backlash gear 383 in the structure and function thereof.

When assembling the first backlash gear 382, a shaft 382f of the plate 382d is inserted into holes 382g and 382h which are formed in the backlash gears 382a and 382b, and then the wings 382e are inserted under the locking pieces 382c of the large backlash gear 382a by rotating the plate 382d with a predetermined angle. A first spring 382k is installed between one of the wings 382e and the large backlash gear 382a. That is, one of the wings 382e is elastically biased with respect to the large backlash gear 382a by the first spring 382k while three wings 382e are locked by three locking pieces 382c. Accordingly, the small backlash gear 382b is to be elastically biased with respect to the large backlash gear 382a by a predetermined angle without separating from the large backlash gear 382a.

The above first backlash gear 382 can prevent any backlash between the optical pickup driving gear 381 and the idler gear 384 efficiently as well as being assembled in a simple manner.

Figure 13:
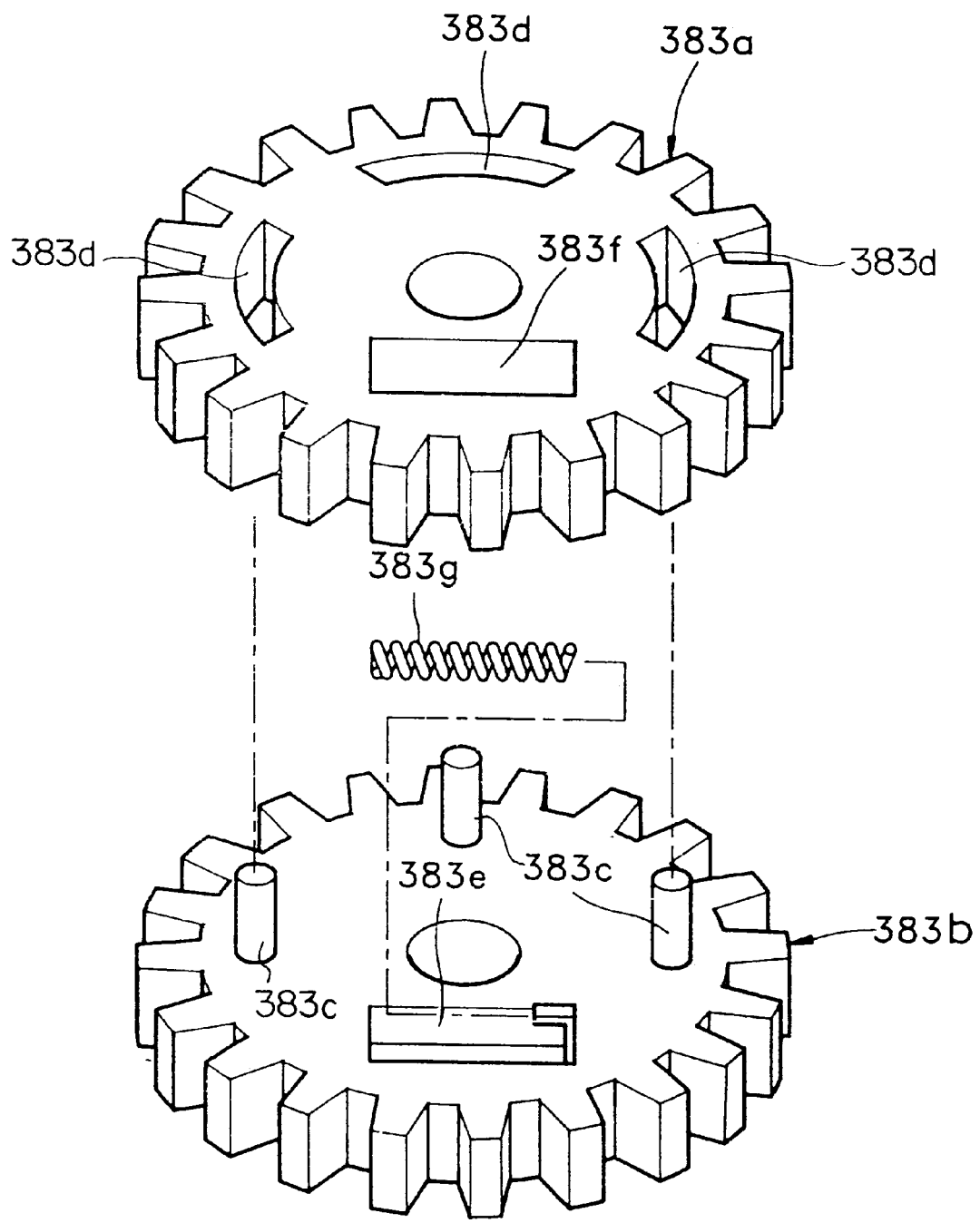
FIG. 13 is an exploded perspective view of a second backlash gear shown in FIG. 5.

Referring to FIGS. 5 and 13, the second backlash gear 383 includes an upper backlash gear 383a and a lower backlash gear 383b which are the same in size, and connects the idler gear 384 and the rack 321 attached to the optical pickup 320. The lower backlash gear 383b has three protrusions 383c and a rectangular depression 383e, and the upper backlash gear 383a has three arc-shaped slots 383d and a rectangular slot 383f.

When assembling the second backlash gear 383, the three slots 383d of the upper backlash gear 383a respectively receive therein the three protrusions 383c of the lower backlash gear 383b. Then, a second spring 383g is installed between the slot 383f and the rectangular depression 383e. As a result, the upper backlash gear 383a is elastically biased with respect to the lower backlash gear 383b by the second spring 383g while being rotatable together with the lower backlash gear 383b by a predetermined angle.

The above second backlash gear 383 can prevent any backlash between the idler gear 384 and the rack 321 efficiently as well as being assembled in a simple manner.

<tray>

Figure 6:
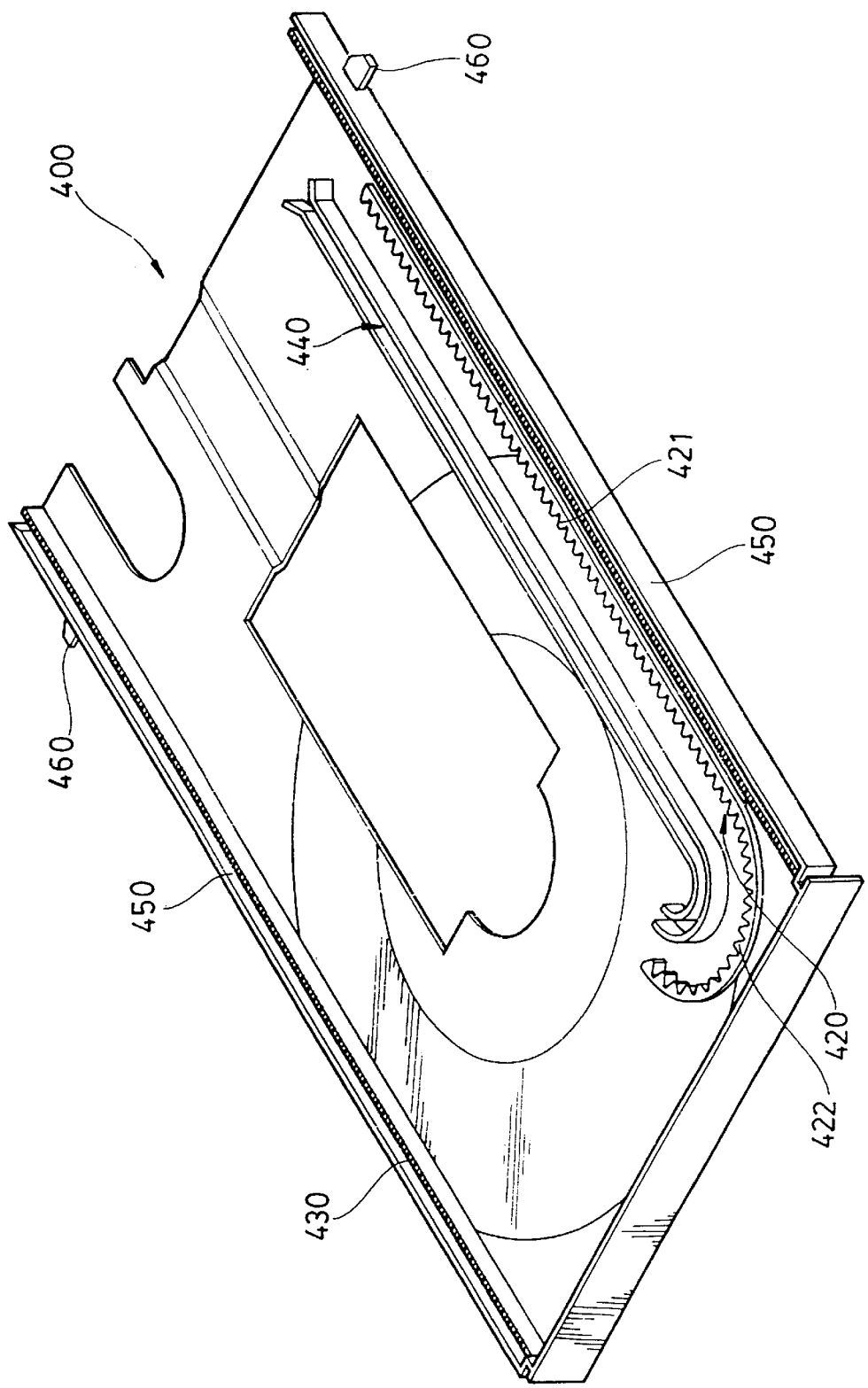
FIG. 6 is a perspective view showing the rear of a tray shown in FIG. 3.

Referring to FIGS. 3 and 6, a disk receiving depression 410 in which a disk is seated is formed on the tray 400, and a tray loading gear 420, a straight tray guiding rack 430, a guide rail 440 and a guide wall 450 are formed on the underside of the tray 400.

The tray 400 carries a disk while being inserted into the optical disk drive and ejected therefrom by the disk loading device 600. The tray 400 of the present invention has the following characteristics.

First, when the tray 400 is inserted into the optical disk drive, the inner side of the tray 400 is blocked so as to prevent the tray 400 from shifting upward from a predetermined position. That is, the inner side of the inserted tray 400 is blocked by a head of a screw 110 coupled to the base frame 100, so that the tray 400 does not shift upward. Even when the optical disk drive is installed in the vertical direction, the tray 400 does not shift from the predetermined position.

Second, the tray 400 has a structure in that the tray 400 is easily assembled to or detached from the base frame 100. A tray hook 120 (see FIG. 3) having elasticity is installed in the base frame 100 and a locking protrusion 460 is formed on either sidewall of the tray 400. Thus, when inserting the tray 400 into the base frame 100, the locking protrusion 460 unfolds the tray hook 120, so that the tray 400 is smoothly inserted into the base frame 100. Also, when detaching the tray 400 from the base frame 100, the tray hook 120 can be unfolded by a worker without contact to the locking protrusion 460, thereby easily separating the tray 400 from the base frame 100.

Third, the tray 400 can be straightly inserted into or detached from the base frame 100 along a predetermined path provided on the base frame 100. Since the tray guiding rack 430 of the tray 400 is engaged with a synchronous gear 130 which is rotatably installed in the base frame 100 when the tray 400 is inserted or ejected, the tray 400 can travel straightly. Particularly, even when the optical disk drive is vertically installed, the tray 400 can travel straightly to be inserted into or ejected from the base frame 100.

The tray loading gear 420 is engaged with a fifth gear 635 of the disk loading device 600 (to be described later referring to FIG. 9) and the guide rail 440 guides a guiding protrusion 640 (see FIG. 9) of the disk loading device 600. The tray loading gear 420 includes a straight portion 421 and a curved portion 422 which will be described later in detail together with the disk loading device 600.

<clamping device>

Figure 7:
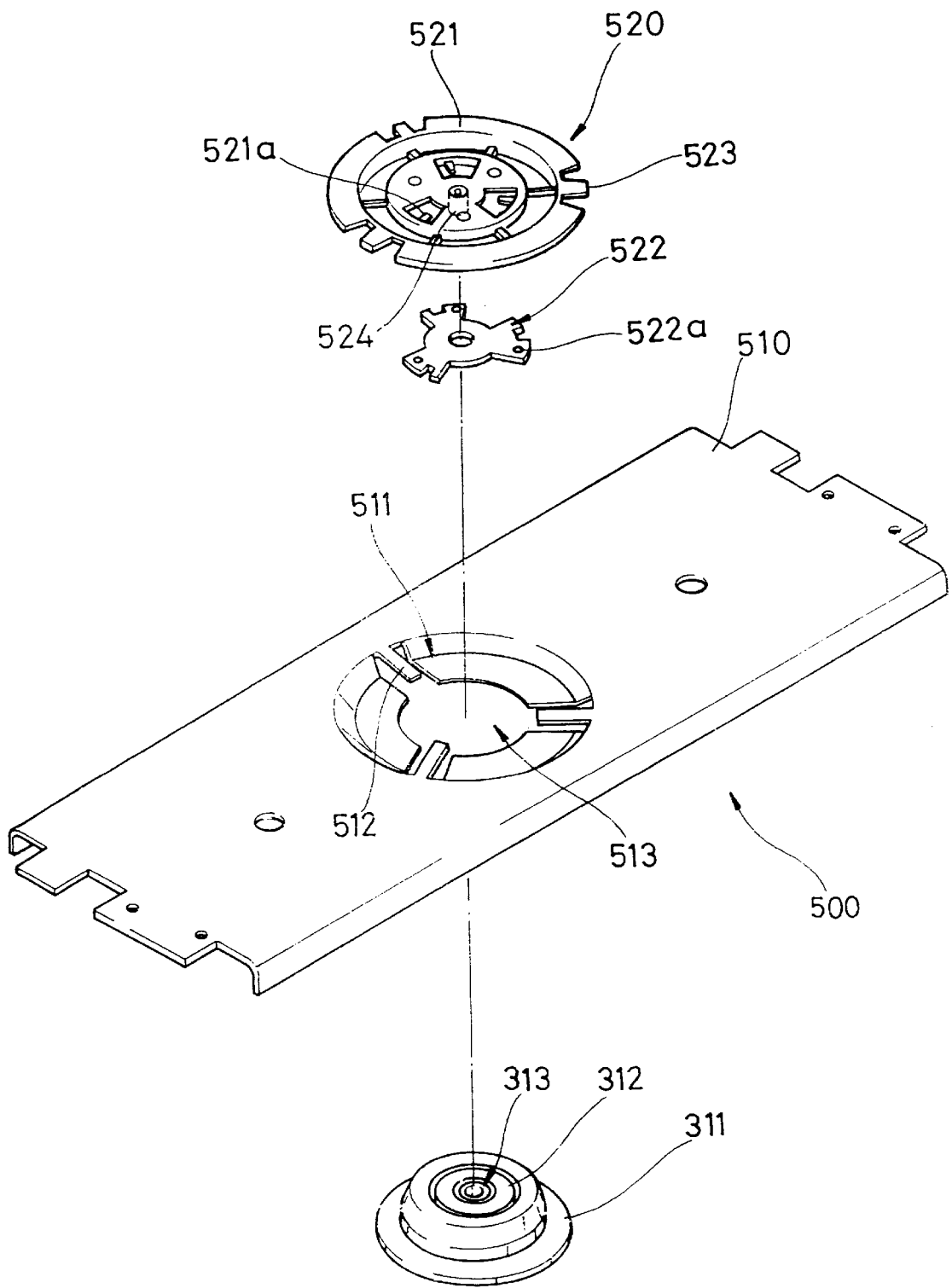
FIG. 7 is an exploded perspective view of a clamping device shown in FIG. 3.

Referring to FIGS. 3 and 7, the clamping device 500 includes a support 510 fixed to the base frame 100 and a clamp 520 installed on the support 510, and closely pushes a disk seated on the turntable 311 to the turntable 311. The clamp 520 includes a clamp base 521 and a clamp plate 522. A permanent magnet 312 is installed on the turntable 311.

The clamping device 500 of the present invention fixes the clamp plate 522 to the clamp base 521 and installs the clamp 520 to the support 510 with ease. Also, the clamping device 500 seats the disk on a predetermined position of the turntable 311 even when the optical disk drive is vertically installed. These features of the clamping device 500 will be described as follows.

First, the clamp base 521 has three locking pieces 521a and the clamp plate 522 has three wings 522a. When fixing the clamp plates 522 to the clamp base 521, the clamp plate 522 is rotated in a predetermined angle, thereby locking three wings 522a in the three locking pieces 521a.

Second, a clamp depression 511 is formed in the support 510 and a clamp hole 513 is formed at the center of the clamp depression 511. Also, three support ribs 512 are formed horizontally, not being slanted, at the slant portion of the clamp depression 511, and three flexible clamp ribs 523 are formed at the border of the clamp base 521. In order to install the clamp base 521 in the clamp depression 511, the clamp ribs 523 are contacted to the support ribs 512 while being pushed. As a result, the clamp base 521 is inserted into the clamp depression 511 while the flexible clamp ribs 523 are bent, thereby preventing the clamp base 521 from being separated from the clamp depression 511.

Third, a clamp shaft 524 is fixed at the center of the clamp base 521 and a clamp shaft receiving groove 313 is formed at the center of the turntable 311. The clamp shaft 524 is inserted into the clamp shaft receiving groove 313 when a disk is pushed onto the turntable 311 by coupling of the clamp plate 522 fixed to the clamp base 521 with the permanent magnet 312 fixed to the turntable 311. Thus, the disk can be exactly seated on a predetermined position of the turntable 311 regardless of the installation state of the disk drive.

<disk loading device>

Figure 9:
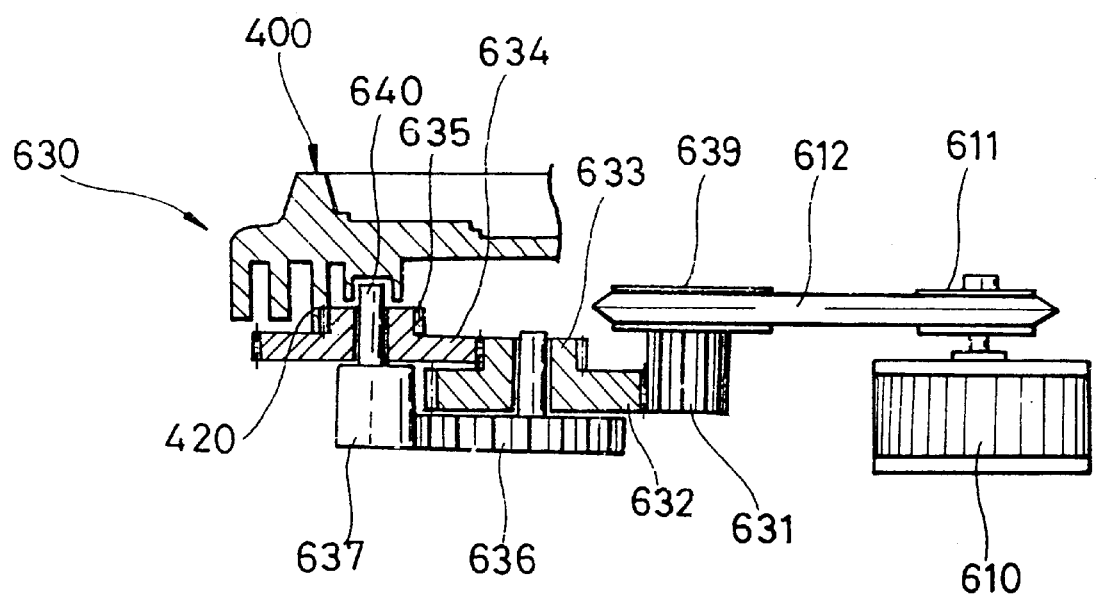
FIG. 9 is a side view of a disk loading gear train shown in FIG. 3.

Referring to FIGS. 3 and 9, the disk loading device 600 includes a disk loading motor 610, a disk loading gear train 630 and an ascending/descending cam 620, and seats a disk on the turntable 311 in cooperation with the tray 400, the deck base 200 and the clamping device 500.

The disk loading gear train 630 includes a first gear 631, a second gear 632, a third gear 633, a fourth gear 634, a fifth gear 635 and a sixth gear 636, and transmits the rotational force of the disk loading motor 610 to the tray 400 and the ascending/descending cam 620.

A pulley 639 is integrally formed with the first gear 631 and the pulley 639 is connected with a pulley 611 installed on the disk loading motor 610 by a belt 612. The second gear 632 is meshed with the first gear 631 which is integrally formed with the third gear 633. The third gear 633 is meshed with the fourth gear 634 which is integrally formed with the fifth gear 635. The sixth gear 636 is concentrically coupled with the second and third gears 632 and 633 at the bottom thereof. A revolving support portion 637 is integrally formed with the sixth gear 636. Also, the revolving support portion 637 is installed to be rotatable around the same axis as that of the fourth and fifth gears 634 and 635.

The disk loading gear train 630 having the above structure transmits the power of the disk loading motor 610 to the tray 400 via the pulley 611, the belt 612, the pulley 639, the first to fifth gears 631 to 635 and the tray loading gear 420. As the fourth and fifth gears 634 and 635 revolve around the center of the second and third gears 632 and 633 by the curved portion 422 (see FIG. 6) of the tray loading gear 420, the sixth gear 636 rotates, thereby rotating the ascending/descending cam 620.

Figure 8:
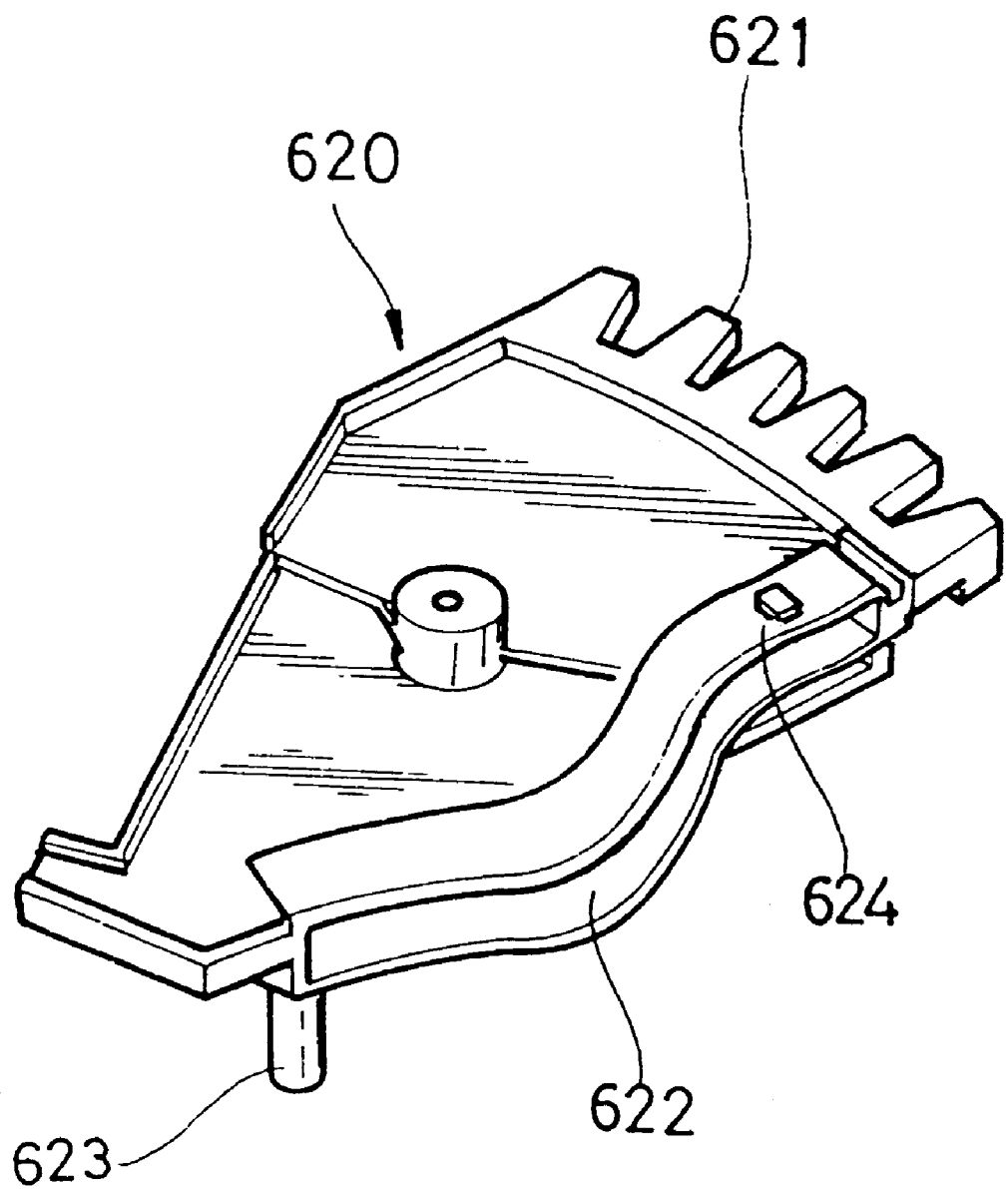
FIG. 8 is a perspective view of a rotary cam shown in FIG. 3.

Referring to FIGS. 3 and 8, the ascending/descending cam 620 includes a gear portion 621, a cam portion 622, an ejecting protrusion 623 and a supporting protrusion 624. The gear portion 621 of the ascending/descending cam 620 is connected to the sixth gear 636 (see FIG. 3 and FIG. 9) to rotate the ascending/descending cam 620 in a predetermined angle, and the cam portion 622 ascends/descends the first ascending/descending protrusion 221 of the deck base 200 as the ascending/descending cam 620 rotates. The supporting protrusion 624 formed on the cam portion 622 prevents the tray 400 from sagging downward. The ejecting protrusion 623 is for manually ejecting the tray 400 when electric power is not supplied to the optical disk drive. That is, since the disk loading motor 610 does not operate if electric power is not supplied to the optical disk drive, the ejecting protrusion 623 of the ascending/descending cam 620 is pushed through an access hole 140 formed at one end of the base frame 100 by using a tool such as an awl, thereby forcibly ejecting the tray 400 from the base frame 100.

The optical disk drive having the above structure of the present invention operates as follows.

<phase and tilt adjustment>

Referring to FIGS. 3 and 5, the complex adjusting device 360 installed at the first shaft 501 is used to adjust the phase and tilt of the optical pickup 320. First, the complex adjusting device 360 installed at the first shaft 501 is fixed to the deck 300 to set the reference position of the phase and tilt. Next, the complex adjusting device 360 installed at the first shaft 501 is adjusted to adjust the tilt of the optical pickup 320. Then, the phase adjusting device 350 installed at the first shaft 501 is adjusted to adjust the phase of the optical pickup 320.

The above-described adjusting procedure of the phase and tilt may be changed and an adjusting method may be differ according to the installation position of the adjusting devices.

<loading and unloading of disk>

Referring to FIGS. 3 and 9, a disk (not shown) is seated in the disk receiving depression 410 of the tray 400 and then a switch (not shown) connected to a controller (not shown) is pushed. The controller drives the disk loading motor 610. As the disk loading motor 610 rotates, the power of the disk loading motor 610 is transmitted to the tray 400 via the disk loading gear train 630.

Referring to FIGS. 3 and 6, since the fifth gear 635 is connected to the straight portion 421 of the tray loading gear 420, the tray 400 is inserted into the optical disk drive. Here, the guiding protrusion 640 protruded on the fifth gear 635 is guided along the guide rail 440 of the tray 400 to move the tray 400 along a predetermined path. Also, the synchronous gear 130 installed in the base frame 100 is connected to the tray guiding rack 430 to move straightly the tray 400.

While the tray 400 is inserted, the fifth gear 635 is meshed with the curved portion 422 of the tray loading gear 420, and the revolving support portion 637 comes to revolve as the fifth gear 35 moves along the curved portion 422. That is, the fifth and fourth gears 635 and 634 revolve around the central axis of the second and third gears 632 and 633. As the fifth and fourth gears 635 and 634 revolve, the sixth gear 636 rotates to then rotate the ascending/descending cam 620.

Referring to FIGS. 3 and 8, as the ascending/descending cam 620 rotates, the first ascending/descending protrusion 221 of the deck base 200 inserted into the cam portion 622 ascends. Also, as the deck base 200 ascends, one end of the deck 300 ascends and the turntable 311 ascends to be coupled with the clamp 520. Then, after the ascended turntable 311 is coupled with the clamp 520, the rotation of the disk loading motor 610 is stopped by the controller.

Referring to FIGS. 3 and 7, as the turntable 311 ascends to be coupled with the clamp 520, a disk (not shown) is closely pushed to the turntable 311 by the coupling force between the clamp plate 522 fixed to the clamp base 521 and the permanent magnet 312 fixed to the turntable 311. Also, as the clamp shaft 524 fixed to the center of the clamp 520 is inserted into the clamp shaft receiving groove 313 formed in the turntable 311, the centers of the clamp 520 and the turntable 311 are aligned.

On the other hand, when a user pushes a switch connected to the controller, the disk loading motor 610 begins to rotate in the opposite direction, so that the disk is unloaded in the opposite sequence to the above-described disk loading process.

<recording/reproducing>

Referring to FIGS. 3 and 5, when the disk is closely pushed to the clamp 520 by the ascended turntable 311, the disk is detached from the tray 400. The disk detached from the tray 400 rotates as the turntable 311 rotates by the spindle motor 310. The optical pickup 320 which moves along the first and second shafts 501 and 502 by the optical pickup driving device 330 installed in the deck 300 radiates a laser beam to record information on the disk or reproduce information from the disk.

The above-described optical disk drive according to the present invention can store a large amount of information in a disk by adopting a highly precise deck mechanism, without limitation in the installation direction and position. In addition, assembling and maintenance can be achieved with ease.

The present invention illustrated and described with reference to the drawings is not limited to the particular embodiments illustrated. That is, further modifications and alterations will occur to those skilled in the art.

What is claimed is:

1. An optical disk drive comprising:

a base frame;

a deck base connected to said base frame by hinge means;

a tray which is inserted into/ejected from said base frame to carry a disk;

disk loading means which is installed in said base frame, for ascending/descending one end of said deck base and inserting/ejecting said tray into/from said base frame;

a deck fixed to said deck base;

a spindle motor installed in said deck and having a shaft;

a turntable installed on the shaft of said spindle motor to receive the disk;

buffering means installed between said deck base and said deck; and clamping means which is installed in said base frame to clamp the disk ascended by said turntable, wherein said clamping means comprises:

a support which is fixed to said base frame and includes a clamp depression having a slant portion, a hole formed at the center of said clamp depression and a plurality of supporting ribs protruded from the slant portion of said clamp depression toward the center of said clamp depression;

a clamp base which is received in said clamp depression and has a plurality of flexible clamp ribs at an edge thereof which correspond to said supporting ribs; and a clamp plate fixed to said clamp base, wherein said clamp ribs are bent by said supporting ribs when pushing said clamp base into said clamp depression.

2. The optical disk drive as claimed in claim 1, wherein said clamp base has a plurality of locking pieces and said clamp plate has a plurality of wings corresponding to said locking pieces, wherein said wings are locked by said locking pieces.

3. The optical disk drive as claimed in claim 1, wherein a clamp shaft is connected to a center of said clamp base and a clamp shaft receiving groove is formed at the center of said turntable, wherein said clamp base and said turntable are coupled along a common axis as said clamp shaft is inserted into said clamp shaft receiving groove.

4. The optical disk drive as claimed in claim 1, wherein said hinge means comprises:

two hinge shafts formed at either side of one end of said deck base;

a hinge hole formed in said base frame; and a hinge hook installed in said base frame, wherein one of said hinge shafts is inserted into said hinge hole and the other of said hinge shafts is coupled to said hinge hook, so that one side of said deck base is pivotally connected to said base frame.

5. The optical disk drive as claimed in claim 1, wherein said disk loading means comprises:

a disk loading motor fixed to said base frame;

an ascending/descending cam which is rotatably installed in said base frame and has a cam portion and a gear portion;

a disk loading gear train installed between said ascending/descending cam and said disk loading motor;

a first ascending/descending protrusion which is formed in said deck base and coupled with said cam portion;

at least one second ascending/descending protrusion which is formed in said deck base and guided by a guide which is vertically formed in said base frame; and a tray loading gear which is installed in said tray is, connected to said disk loading gear train, and which has a straight portion and a curved portion.

6. The optical disk drive as claimed in claim 5, wherein said disk loading gear train comprises:

a first gear portion which is rotatably installed in said base frame and rotates by said disk loading motor; and a second gear portion which is installed in said base frame to revolve through a predetermined angle and rotates by said first gear portion and revolves along the curved portion of said tray loading gear.

7. The optical disk drive as claimed in claim 6, wherein a protrusion is formed on said second gear portion and a guide rail is formed in said tray, wherein said second gear portion revolves as said protrusion moves along said guide rail.

8. The optical disk drive as claimed in claim 5, wherein a protrusion portion is formed on said ascending/descending cam, and said protrusion portion supports said tray while said tray is loaded.

9. The optical disk drive as claimed in claim 5, wherein said ascending/descending cam further comprises an ejecting protrusion, and said tray is forcibly ejected by pushing said ejecting protrusion through a hole of said base frame.

10. The optical disk drive as claimed in claim 5, wherein a synchronous gear is installed in said base frame and a tray guiding rack engaged with said synchronous gear is formed on said tray, wherein said tray is inserted or ejected straight by the engagement of said synchronous gear and said tray guiding rack.

11. The optical disk drive as claimed in claim 1, wherein a synchronous gear is installed in said base frame and a tray guiding rack engaged with said synchronous gear is formed on said tray, wherein said tray is inserted or ejected straight by the engagement of said synchronous gear and said tray guiding rack.

12. The optical disk drive as claimed in claim 1, wherein said base frame further comprises a screw which is threaded thereon, and said screw limits the ascending of said tray while said tray is loaded.

13. The optical disk drive as claimed in claim 1, wherein said buffering means comprises:

a plurality of elastic buffering members each having a neck inserted into said deck and a locking hole; and a plurality of buffering protrusions which are formed in said deck base and coupled to said locking holes of said buffering members.

14. An optical disk drive comprising:

a base frame;

a deck base connected to said base frame by a hinge;

a tray which is inserted into and ejected from said base frame to carry a disk;

a disk loading device installed in said base frame and connected to said tray and said deck base to ascend/descend one end of said deck base and to move said tray;

a deck fixed to said deck base;

a spindle motor installed in said deck and having a shaft;

a turntable installed on the shaft of said spindle motor to receive the disk;

a buffering member installed between said deck base and said deck; and a clamping device installed in said base frame to clamp the disk ascended by said turntable, wherein said clamping device comprises:
- a support which is fixed to said base frame and which includes a clamp depression having a slant portion, a hole formed at the center of said clamp depression and a plurality of supporting ribs protruded from the slant portion of said clamp depression toward the center of said clamp depression;
- a clamp base which is received in said clamp depression and has a plurality of flexible clamp ribs at an edge thereof which correspond to said supporting ribs; and
- a clamp plate fixed to said clamp base, wherein said clamp ribs are bent by said supporting ribs when pushing said clamp base into said clamp depression.

15. The optical disk drive as claimed in claim 14, wherein said clamp base has a plurality of locking pieces and said clamp plate has a plurality of wings corresponding to said locking pieces, wherein said wings are locked by said locking pieces.

16. The optical disk drive as claimed in claim 14, wherein a clamp shaft is connected to a center of said clamp base and a clamp shaft receiving groove is formed at the center of said turntable, wherein said clamp base and said turntable are coupled along a common axis as said clamp shaft is inserted into said clamp shaft receiving groove.

17. The optical disk drive as claimed in claim 14, wherein said hinge comprises:
- two hinge shafts formed at either side of one end of said deck base;
- a hinge hole formed in said base frame; and
- a hinge hook installed in said base frame,
- wherein one of said hinge shafts is inserted into said hinge hole and the other of said hinge shafts is coupled to said hinge hook, so that one side of said deck base is pivotally connected to said base frame.

18. The optical disk drive as claimed in claim 14, wherein said disk loading device comprises:
- a disk loading motor fixed to said base frame;
- an ascending/descending cam which is rotatably installed in said base frame and has a cam portion and a gear portion;
- a disk loading gear train installed between said ascending/descending cam and said disk loading motor;
- a first ascending/descending protrusion which is formed in said deck base and coupled with said cam portion;
- at least one second ascending/descending protrusion which is formed in said deck base and guided by a guide which is vertically formed in said base frame; and
- a tray loading gear which is installed in said tray, is connected to said disk loading gear train, and which has a straight portion and a curved portion.

* * * * *